(12) United States Patent
Rice et al.

(10) Patent No.: US 8,083,630 B2
(45) Date of Patent: Dec. 27, 2011

(54) COMPACT PLANETARY TRANSMISSION

(75) Inventors: James S. Rice, Deer Creek, IL (US);
Kevin G. Meyer, Metamora, IL (US);
Michael W. Krause, Manito, IL (US);
Larry W. Carpenter, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 470 days.

(21) Appl. No.: 12/341,572

(22) Filed: Dec. 22, 2008

(65) Prior Publication Data

US 2010/0160107 A1    Jun. 24, 2010

(51) Int. Cl.
*F16H 3/44* (2006.01)
(52) U.S. Cl. ........................................ 475/280; 475/288
(58) Field of Classification Search .......... 475/275–291, 475/296, 330, 269
See application file for complete search history.

(56) References Cited

U.S. PATENT DOCUMENTS

| | | |
|---|---|---|
| 3,946,623 A | 3/1976 | Murakami et al. |
| 3,956,946 A | 5/1976 | Murakami et al. |
| 3,971,267 A | 7/1976 | Murakami et al. |
| 3,971,268 A | 7/1976 | Murakami et al. |
| 3,987,690 A | 10/1976 | Murakami et al. |
| 3,999,448 A | 12/1976 | Murakami et al. |
| 4,027,551 A | 6/1977 | Murakami et al. |
| 4,038,888 A | 8/1977 | Murakami et al. |
| 4,046,031 A | 9/1977 | Ott et al. |
| 4,205,563 A | 6/1980 | Gorrell |
| 4,420,992 A * | 12/1983 | Windish ........................ 475/118 |
| 4,531,428 A | 7/1985 | Windish |
| 4,683,776 A | 8/1987 | Klemen |
| 5,106,352 A | 4/1992 | Lepelletier |
| 6,176,803 B1 | 1/2001 | Meyer et al. |
| 6,827,664 B2 | 12/2004 | Stevenson et al. |
| 6,960,150 B2 | 11/2005 | Armstrong et al. |
| 6,994,649 B2 | 2/2006 | Raghavan et al. |
| 7,128,683 B2 | 10/2006 | Oguri et al. |
| 7,416,507 B1 | 8/2008 | Carey et al. |
| 7,601,090 B2 * | 10/2009 | Shim ............................. 475/276 |
| 7,704,181 B2 * | 4/2010 | Phillips et al. ................ 475/275 |
| 7,753,820 B2 * | 7/2010 | Phillips et al. ................ 475/276 |
| 7,914,414 B2 * | 3/2011 | Phillips et al. ................ 475/276 |
| 2002/0183160 A1 | 12/2002 | Kao et al. |
| 2005/0215382 A1 | 9/2005 | Raghavan et al. |
| 2006/0270514 A1 | 11/2006 | Oguri et al. |
| 2007/0213169 A1 | 9/2007 | Gumpoltsberger |
| 2007/0232437 A1 | 10/2007 | Kamm et al. |
| 2008/0108472 A1 | 5/2008 | Seo |
| 2008/0125269 A1 | 5/2008 | Gumpoltsberger |

(Continued)

FOREIGN PATENT DOCUMENTS

JP        2005-083479 A        3/2005

(Continued)

*Primary Examiner* — David D Le
*Assistant Examiner* — Lillian Nguyen
(74) *Attorney, Agent, or Firm* — Leydig, Voit & Mayer (57) ABSTRACT

The transmission includes a housing, input and output shafts, and four planetary gear trains each having at least three members including a ring gear, at least one carrier, and a sun gear. The input and output shafts are is continuously interconnected with gear(s) and/or carrier(s). Links continuously interconnect the carrier(s) and/or gears between gear trains. The six torque-transmitting mechanisms are engagable in combinations of two to establish at least seven forward speed ratios and at least one reverse speed ratio between the input shaft and the output shaft.

20 Claims, 5 Drawing Sheets

U.S. PATENT DOCUMENTS

| | | | |
|---|---|---|---|
| 2009/0209391 A1* | 8/2009 | Carey et al. | 475/282 |
| 2009/0215580 A1* | 8/2009 | Hart et al. | 475/276 |
| 2010/0069195 A1* | 3/2010 | Baldwin | 475/276 |
| 2010/0210401 A1* | 8/2010 | Phillips et al. | 475/275 |
| 2010/0216591 A1* | 8/2010 | Wittkopp et al. | 475/275 |

FOREIGN PATENT DOCUMENTS

| | | |
|---|---|---|
| JP | 2006-266389 A | 10/2006 |
| KR | 10-0812443 B1 | 3/2008 |
| KR | 10-0829298 B1 | 5/2008 |

* cited by examiner

|     |        | 111 | 112 | 113 | 114 | 115 | 116 |
| --- | ------ | --- | --- | --- | --- | --- | --- |
| 1F  | 4.539  |     |     |     |     | X   |     |
| 2F  | 3.316  |     | X   |     | X   |     |     |
| 3F  | 2.436  | X   |     |     | X   |     |     |
| 4F  | 1.818  | X   | X   |     | X   |     |     |
| 5F  | 1.369  | X   |     |     |     |     | X   |
| 6F  | 1.000  |     | X   |     |     | X   | X   |
| 7F  | 0.731  |     |     | X   |     |     | X   |
| R1  | -3.539 |     |     | X   |     | X   |     |
| R2  | -2.585 |     | X   | X   |     |     |     |

COMPACT PLANETARY TRANSMISSION

TECHNICAL FIELD

This patent disclosure relates generally to multi-speed transmissions in a planetary design, and, more particularly to such transmissions that provide at least seven forward speeds and one reverse speed.

BACKGROUND

Generally, planetary transmissions include a plurality of planetary gear trains that are shifted using friction elements and/or control elements, such as brakes and clutches. For many years, most industrial transmissions were fractionated transmissions composed of two, two degree of freedom gearboxes in series. Such arrangements can be relatively large and cumbersome in order to meet the performance and speed criterion for practical use in industrial applications.

More recently, numerous more compact, multispeed transmissions have been proposed and are in use. For example, U.S. Patent Publication 2008/0108472 A1 to Seo, et al., proposed a planetary transmission with four gear trains, three clutches and four brakes, to provide a four-degree of freedom transmission with seven forward speeds and two reverse speeds. It remains desirable, however, to provide a compact planetary gearing arrangement that includes a minimum number of components that meets the performance criterion for use in industrial applications.

SUMMARY

The disclosure describes, in one aspect, a multi-speed transmission comprising a housing, input and output shafts, and four planetary gear trains, each having at least three members including a ring gear, at least one carrier, and a sun gear. The input shaft is continuously interconnected with the carrier of the second planetary gear train and the ring gear of the first planetary gear train. The output shaft is continuously interconnected with the carrier of the fourth planetary gear train and the ring gear of the third planetary gear train. A first link continuously interconnects the carrier of the first planetary gear train and the carrier of the third planetary gear train. Second and third links continuously interconnect the ring gear of the second planetary gear train and the sun gears of the third and fourth planetary gear trains. Six torque-transmitting mechanisms selectively interconnect the members of the planetary gear trains with the housing or with other members of the planetary gear trains. The six torque-transmitting mechanisms are engaged in combinations of two to establish at least seven forward speed ratios and at least one reverse speed ratio between the input shaft and the output shaft.

The disclosure describes in another aspect a multi-speed transmission comprising a housing, an input shaft, an output shaft, and first, second, third and fourth planetary gear trains each having at least three members including a ring gear, at least one carrier, and a sun gear. The input shaft is continuously interconnected with the carrier of the second planetary gear train and the ring gear of the first planetary gear train. The output shaft is continuously interconnected with the carrier of the fourth planetary gear train and the ring gear of the third planetary gear train. A first link continuously interconnects the carrier of the first planetary gear train and the carrier of the third planetary gear train. A second link and a third link continuously interconnect the ring gear of the second planetary gear train and the sun gears of the third and fourth planetary gear trains. A first torque-transmitting mechanism selectively interconnects the sun gear of the first planetary gear train with the housing. A second torque-transmitting mechanism selectively interconnects the sun gear of the second planetary gear train with the housing. A third torque-transmitting mechanism selectively interconnects the carrier of the first planetary gear train and the carrier of the third planetary gear train with the housing. A fourth torque-transmitting mechanism selectively interconnects the ring gear of the fourth planetary gear train with the housing. A fifth torque-transmitting mechanism selectively interconnects at least one member of one of the planetary gear trains with at least one of the input shaft and a member of another of the planetary gear trains. A sixth torque-transmitting mechanism selectively interconnects at least one member of one of the planetary gear trains with at least one of the output shaft and a member of another of the planetary gear trains. The torque-transmitting mechanisms are engaged in combinations of two to establish at least seven forward speed ratios and at least one reverse speed ratio between said input shaft and said output shaft.

In yet another aspect, the disclosure is directed to a multi-speed transmission comprising a housing, input and output shafts, four planetary gear trains, and selectively engagable control elements. The first, second, third, and fourth planetary gear trains each have at least three members including a sun gear, a carrier, and a ring gear. The selective engagement of the control elements creates different gear ratios between the input shaft and the output shaft so that at least seven forward gears and one reverse gear can be implemented. The control elements include first, second, third and fourth brakes, and first and second torque transmitting mechanisms. The carrier of the second gear train, the input shaft, and the ring gear of the first gear train are continuously connected. The carrier of the first gear train and the carrier of the third gear train are continuously connected. The ring gear of the second gear train, the sun gear of the third gear train, and the sun gear of the fourth gear train are continuously connected. The carrier of the fourth gear train, the output shaft, and the ring gear of the third gear train are continuously connected. The sun gear of the first gear train is detachably connected to the housing by the first brake. The sun gear of the second gear train is detachably connected to the housing by the second brake. The carriers of the first and third gear trains are detachably connected to the housing by the third brake. The ring gear of the fourth gear train is detachably connected to the housing by the fourth brake. The first torque transmitting mechanism detachably connects the input shaft, ring gear of the first train, and carrier of the second train to the ring gear of the second gear train, and the sun gears of the third and fourth gear trains, or the sun gear of the second gear train. The second torque transmitting mechanism detachably connects the ring gear of the second gear train, and the sun gears of the third and fourth gear trains to the carrier of the first gear train and the carrier of the third gear train, or the ring gear of the third gear train, the carrier of the fourth gear train, and the output shaft.

DETAILED DESCRIPTION

This disclosure relates to a planetary transmission arrangement that includes four planetary gear trains and six selectively engagable torque transmitting mechanisms or control elements, and which provides at least seven forward speeds and one or two reverse speeds. While four embodiments of the arrangement are illustrated in FIGS. 1 and 3-5, respectively, it will be appreciated that additional embodiments are possible within the spirit and scope of this disclosure. The planetary transmission arrangement disclosed herein has universal applicability to power trains in various types of machines. The term "machine" may refer to any machine that performs some type of operation associated with an industry such as mining, construction, farming, transportation, or any other industry known in the art. For example, the machine may be an earth-moving machine, such as a tractor, wheel loader, excavator, dump truck, backhoe, motor grader, material handler or the like. Moreover, one or more implements may be connected to the machine. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, moldboards, rippers, scarifiers, shears, snow plows, snow wings, and others.

In each of the embodiments shown in FIGS. 1 and 3-5, respectively, certain standard elements are provided. Similar components between the various embodiments include the same or similar reference numbers. By way of background, however, a short explanation is presented regarding the common features of the embodiments, omitting any reference numbers. The various embodiments will then be described in relevant detail, including the reference numbers.

Each embodiment includes an input shaft I and an output shaft O. The input shaft I is coupled to an engine (not shown), for example, either directly or by way of a torque converter, while the output shaft O is continuously coupled with a final drive mechanism (not shown). Further, each of the embodiments includes four planetary gear trains, each planetary gear train including a ring gear, a carrier that is coupled to one or more planetary gears, and a sun gear. Collectively, the ring gear, carrier, and sun gear may be referred to as members of the respective planetary gear trains. The planetary gear trains will be described and illustrated as arranged in a given sequence in the axial direction. It will be appreciated, however, that alternate orders of the planetary gear trains are appropriate, and even though this description and the appended claims may refer to the planetary gear trains as first, second, third, and fourth planetary gear trains, the respective trains may be physically disposed in an alternate order. By way of example only, the first planetary gear train may be physically disposed in the second, third, or fourth position relative to the other gear trains, and likewise with regard to each of the second, third, and fourth gear trains.

In each embodiment, certain of the elements of the various gear trains are fixedly coupled together by interconnecting members or links, as will be explained below. Moreover, each embodiment includes six selectively engagable torque-transmitting mechanisms or control elements, namely, four brakes and two clutches. The location of the brakes is consistent between the four embodiments, in each case, selectively coupling the associated planetary gear train element to a housing or the like. The placement of the clutches, however, may vary between the embodiments. In any event, in each embodiment, the respective arrangement provides seven forward gear ratios, and at least one or two reverse gear ratios as a result of selective engagement of the torque-transmitting members.

Figure 1:
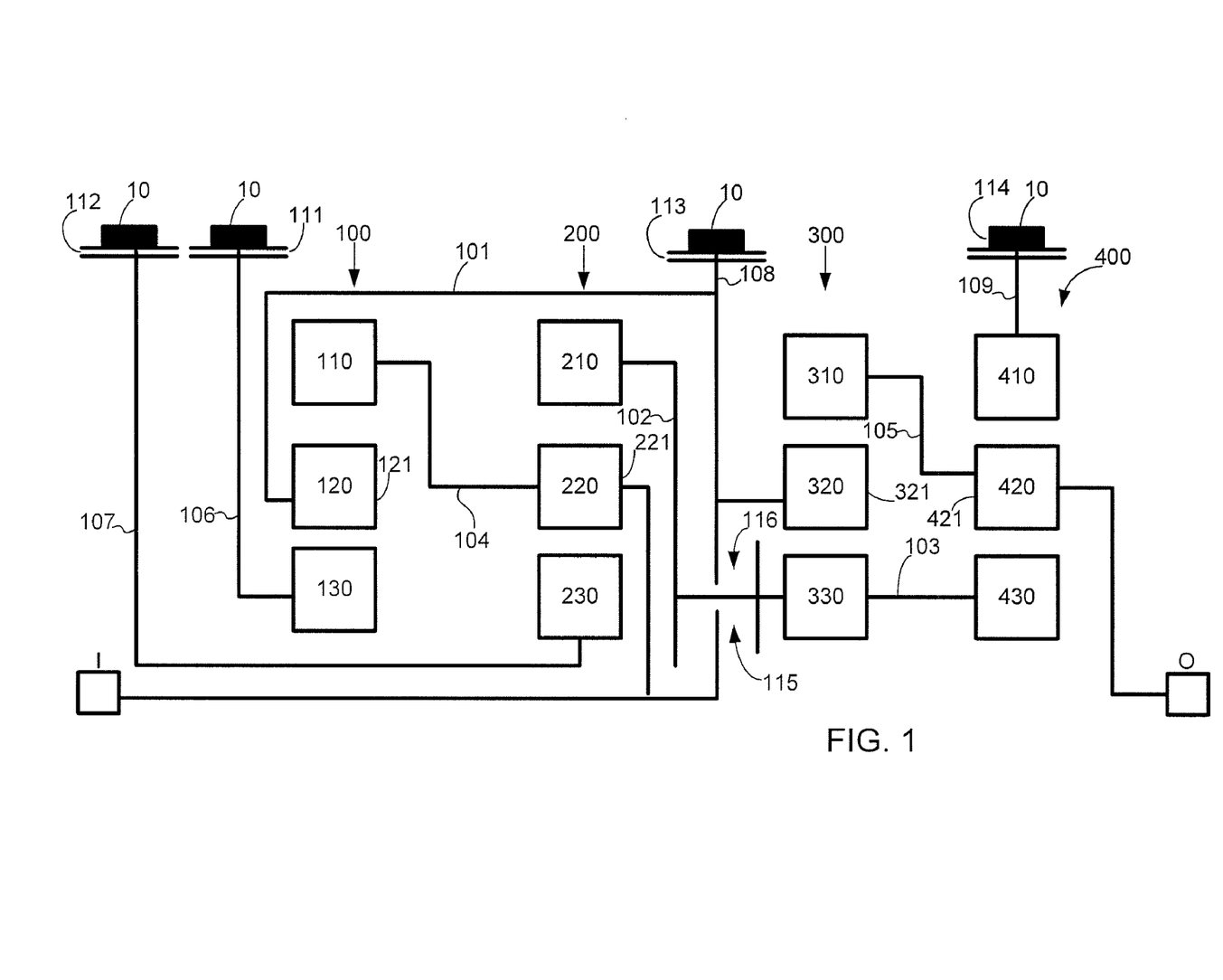
FIG. 1 is a schematic illustration of an embodiment of an exemplary multispeed transmission according to the disclosure.

Turning first to the embodiment illustrated in FIG. 1, four planetary gear trains 100, 200, 300, 400 are provided, which are illustrated as arranged in sequence in the axial direction. As explained above, however, alternate orders of the planetary gear trains are appropriate. Each planetary gear train 100, 200, 300, 400 includes a ring gear 110, 210, 310, 410, a carrier 120, 220, 320, 420, and a sun gear 130, 230, 330, 430, respectively. Each of the planetary gear trains 100, 200, 300, 400 includes one or more planet gears 121, 221, 321, 421 that mesh with the respective sun and ring gears 110, 130, 210, 230, 310, 330, 410, 430, as will be understood by those of skill in the art. Such planet gears have fixed axes with respect to the carriers 120, 220, 320, 420 of the planetary gear trains 100, 200, 300, 400, respectively.

In the illustrated embodiments, the carrier 120 of the first planetary gear train 100 is continuously interconnected with the carrier 320 of the third planetary gear train 300 by a first link 101. The ring gear 210 of the second planetary gear train 200 is continuously interconnected with the sun gear 330 of the third planetary gear train 300 by a second link 102, while the sun gear 330 of the third planetary gear train 300 is continuously interconnected with the sun gear 430 of the fourth planetary gear train 400 by a third link 103. It will be appreciates that the ring gear 210 of the second planetary gear train 200 could be directly connected to the sun gear 430 of the fourth planetary gear train 400 with the same effect.

The input shaft I is continuously interconnected with the carrier 220 of the second planetary gear train 200, while the ring gear 110 of the first planetary gear train 100 is continuously interconnected with the carrier 220 of the second planetary gear train 200 by way of a fourth link 104. It will be appreciated, however, that the input shaft I could alternately be continuously interconnected with the ring gear 110 of the first planetary gear train 100 with the same result.

The ring gear 310 of the third planetary gear train 300 is continuously interconnected with the carrier 420 of the fourth planetary gear train 400 by a fifth link 105, while the output shaft O is likewise continuously interconnected with the carrier of 420 of the fourth planetary gear train 400. It will be appreciated that the output shaft O could alternately be continuously interconnected with the ring gear 310 of the third planetary gear train 300 with the same result.

Each of the embodiments includes only six selectively engagable torque-transmitting mechanisms or control elements, as shown in the embodiment of FIG. 1, four stationary members or brakes 111, 112, 113, 114, and two clutches 115, 116. The brakes 111, 112, 113, 114 selectively interconnect the associated member with a housing 10 or other stationary element. Turning to the relationship of the brakes 111, 112, 113, 114 to the individual gears of the gear trains, the sun gear 130 of the first planetary gear train 100 is selectively interconnected to the first brake 111 by a sixth link 106. The sun gear 230 of the second planetary gear train 200 is selectively interconnected with the second brake 112 by a seventh link 107. The carrier 120 of the first planetary gear train 100 and the carrier 320 of the third planetary gear train 300 are selectively interconnected with the third brake 113 by an eighth link 108. It will be appreciated that the third brake 113 could be directly connected to either the carrier 120 of the first planetary gear train 100 or the carrier 320 of the third planetary gear train 300 in order to provided selectable braking to both such carriers 120, 320. Finally, the ring gear 410 of the fourth planetary gear train 400 is selectively interconnected with the fourth brake 114 by a ninth link 109. In this way, the various brakes 111, 112, 113, 114 are selectively engagable to the arrest movement of associated gear(s) or carrier(s).

While the placement of the four selectively engagable brakes 111, 112, 113, 114 is uniform between the four illustrated embodiments of FIGS. 1 and 3-5, the illustrated embodiments differ with regard to the placement of the two selectively engagable clutches 115, 116. In the embodiment of FIG. 1, the first clutch 115 is disposed to render the input shaft I, and the associated the ring gear 110 of the first planetary gear train 100 and carrier 220 of the second planetary gear train 200, selectively engagable with the ring gear 210 of the second planetary gear train, the sun gears 330, 430 of the third and fourth planetary gear trains 300, 400. The second clutch 116 is disposed to likewise render the carriers 120, 320 of the first and third planetary gear trains 100, 300, and the brake 113 selectively engagable with the ring gear 210 of the second planetary gear train and the sun gears 330, 430 of the third and fourth planetary gear trains 300, 400.

Figure 2:
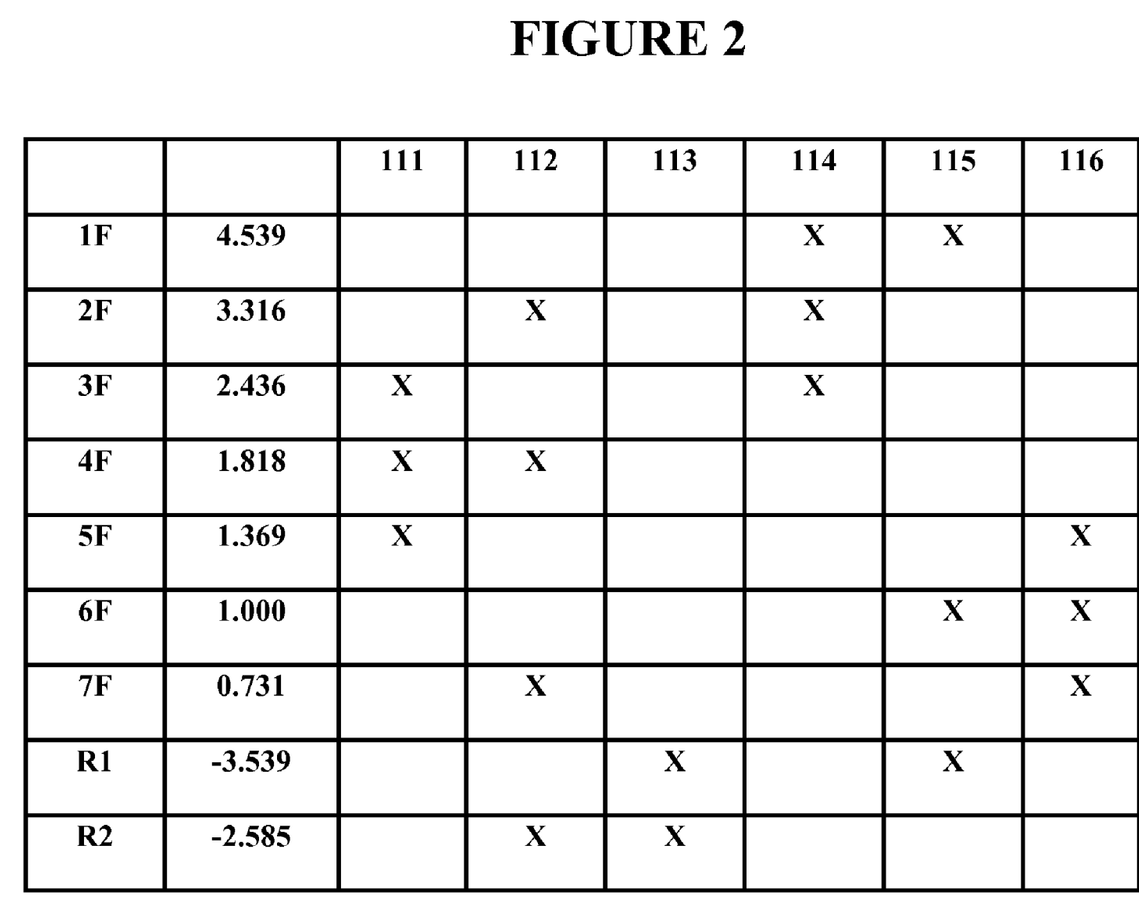
FIG. 2 is a table of exemplary gear reductions associated with various combinations of engagements torque transmitting mechanisms or control elements.

Turning to FIG. 2, there is provided a table of combinations of engagements of the selectively engagable brakes 111, 112, 113, 114 and clutches 115, 116 illustrated in FIG. 1 to provide seven forward speed ratios and two reverse speed ratios. For the illustrated ratios, the ring gear/sun gear tooth ratio for both the first and second planetary gear trains 100, 200 is 2.711, while the ring gear/sun gear tooth ratio for the third and fourth planetary gear trains 300, 400 is 3.539. Those of skill in the art will appreciate, however, that the tooth ratios of the four planetary gear trains 100, 200, 300, 400 may be any appropriate ratio or ratios to provide alternate desired results. Referring to the table of FIG. 2, the first column shows the speed ratio, that is, first forward (1F) through seventh forward (7F), and first and second reverse (1R and 2R), while the second column shows the input to output gear ratio. The remaining six columns show the particular brakes 111, 112, 113, 114 or clutches 115, 116 engaged for the given ratio.

The first forward speed ratio (1F) is established with the engagement of the fourth brake 114 and the first clutch 115. Engagement of the first clutch 115 connects the input shaft I, and the associated ring gear 110 of the first planetary gear train 100 and carrier 220 of the second planetary gear train 200 with the ring gear 210 of the second planetary gear train and the sun gears 330, 430 of the third and fourth planetary gear trains 300, 400. As a result, the sun gears 330, 430 of the third and fourth planetary gear trains 300, 400 will rotate at the same speed as the input shaft I.

The engagement of the fourth brake 114 arrests rotational movement of the ring gear 410 of the fourth planetary gear train 400. Inasmuch as ring gear 410 is held stationary, the carrier 420 of the fourth planetary gear train 400 and the output shaft O will rotate at a speed determined by the rotational speed of the sun gear 430 of the fourth planetary gear train 400, that is, the rotational speed of the input shaft I, and the ring gear/sun gear tooth ratio of the fourth planetary gear train 400. Thus, the numerical value of the first forward speed ratio (1F) is determined utilizing the ring gear/sun gear tooth ratio of the fourth planetary gear train 400.

The second forward speed ratio (2F) is established with the engagement of the second and fourth brakes 112, 114. The engagement of the second brake 112 arrests rotational movement of the sun gear 230 of the second planetary gear train 200. Inasmuch as the carrier 220 of the second planetary gear train 200 will rotate at a speed determined from the speed of the input shaft I, the speed of the ring gear 210 of the second planetary gear train 200 will be based upon the speed of the input shaft I and the ring gear/sun gear tooth ratio of the second planetary gear train 200. The sun gears 330, 430 of the third and fourth planetary gear trains 300, 400 will rotate at the same speed as the ring gear 210 of the second planetary gear train 200.

The engagement of the fourth brake 114 arrests rotational movement of the ring gear 410 of the fourth planetary gear train 400. Inasmuch as ring gear 410 is held stationary, the carrier 420 of the fourth planetary gear train 400 and the output shaft O will rotate at a speed determined by the rotational speed of the sun gear 430 of the fourth planetary gear train 400 and the ring gear/sun gear tooth ratio of the fourth planetary gear train 400. Thus, the numerical value of the second forward speed ratio (2F) is determined utilizing the ring gear/sun gear tooth ratio of the second planetary gear train 200 and the ring gear/sun gear tooth ratio of the fourth planetary gear train 400.

The third forward speed ratio (3F) is established with the engagement of the first and fourth brakes 111, 114. The engagement of the first brake 111 arrests rotational movement of the sun gear 130 of the first planetary gear train 100. Consequently, inasmuch as the carrier 220 of the second planetary gear train 200 and the ring gear 110 of the first planetary gear train 100 rotate at the same speed as the input shaft I, the carrier 120 of the first planetary gear train 100 will rotate at a speed determined from the speed of the input shaft I and the ring gear/sun gear tooth ratio of the first planetary gear train 100. The carrier 320 of the third planetary gear train 300 will rotate at the same speed of as the carrier 120 of the first planetary gear train 100.

The engagement of the fourth brake 114 arrests rotational movement of the ring gear 410 of the fourth planetary gear train 400. Inasmuch as the output shaft O, the ring gear 310 of the third planetary gear train 300 and the carrier 420 of the fourth planetary gear train 400 are connected by link 105, the rotational speeds of each of these will be the same. Similarly, the rotational speeds of the sun gears 330, 430 of the third and fourth planetary gear trains 300, 400 will be the same as a result of link 103. Accordingly, the rotational speeds of the ring gear 310 of the third planetary gear train 300, carrier 420 of the fourth planetary gear train 400, and the output shaft O may be calculated based upon these relationships and the respective ring gear/sun gear tooth ratio relationships of the third and fourth planetary gear trains 300, 400. Thus, the numerical value of the third forward speed ratio (3F) is determined utilizing the planet gear/sun gear/ring gear tooth ratios of the first, third, and fourth planetary gear trains 100, 300, 400.

The fourth forward speed ratio (4F) is established with the engagement of the first and second brakes 111, 112. The engagement of the first brake 111 arrests rotational movement of the sun gear 130 of the first planetary gear train 100. Consequently, inasmuch as the carrier 220 of the second planetary gear train 200 and the ring gear 110 of the first planetary gear train 100 rotate at the same speed as the input shaft I, the carrier 120 of the first planetary gear train 100 will rotate at a speed determined from the speed of the input shaft I and the ring gear/sun gear tooth ratio of the first planetary gear train 100. The carrier 320 of the third planetary gear train 300 will rotate at the same speed of as the carrier 120 of the first planetary gear train 100.

The engagement of the second brake 112 arrests rotational movement of the sun gear 230 of the second planetary gear train 200. As the carrier 220 of the second planetary gear train 200 rotates at the same speed as input shaft I, the rotational speed of the ring gear 210 of the second planetary gear train 200 may be determined from the speed of the input shaft I and the ring gear/sun gear tooth ratio of the second planetary gear train 200. The sun gears 330, 430 of the third and fourth planetary gear trains 300, 400 rotate at the same speed as the ring gear 210 of the second planetary gear train 200.

As a result, the rotational speed of the ring gear 310 of the third planetary gear train 300, and, therefore, the output shaft O, may be calculated based upon the rotational speeds of the carrier 320 and sun gear 330, and the ring gear/sun gear tooth ratios of the third planetary gear train 300. Thus, the numerical value of the fourth forward speed ratio (4F) is determined utilizing the ring gear/sun gear tooth ratios of the first, second, and third planetary gear trains 100, 200, 300.

The fifth forward speed ratio (5F) is established with the engagement of the first brake 111 and the second clutch 116. The engagement of the first brake 111 arrests rotational movement of the sun gear 130 of the first planetary gear train 100. Consequently, inasmuch as the carrier 220 of the second planetary gear train 200 and the ring gear 110 of the first planetary gear train 100 rotate at the same speed as the input shaft I, the carrier 120 of the first planetary gear train 100 will rotate at a speed determined from the speed of the input shaft I and the ring gear/sun gear tooth ratio of the first planetary gear train 100. The carrier 320 of the third planetary gear train 300 will rotate at the same speed of as the carrier 120 of the first planetary gear train 100.

Engagement of the second clutch 116 connects the carriers 120, 320 of the first and third planetary gear trains 100, 300 with the ring gear 210 of the second planetary gear train 200 and the sun gears 330, 430 of the third and fourth planetary gear trains 300, 400. As a result, the ring gear 210 of the second planetary gear train 200 and the sun gears 330, 430 of the third and fourth planetary gear trains 300, 400 will rotate at the same speed as the carriers 120, 320 of the first and third planetary gear trains 100, 300.

The rotational speed of the ring gear 310 of the third planetary gear train 300 may be calculated from the rotational speed of the carrier 320 and sun gear 330. The carrier 420 of the fourth planetary gear train 400 will rotate at the same speed as the ring gear 310 of the third planetary gear train 300. Thus, the numerical value of the fifth forward speed ratio (5F) is determined utilizing the ring gear/sun gear tooth ratio of the first planetary gear train 100.

The sixth forward speed ratio (6F) is established with the engagement of the first and second clutches 115, 116. Engagement of the first clutch 115 connects the input shaft I, and the associated the ring gear 110 of the first planetary gear train 100 and carrier 220 of the second planetary gear train 200 with the ring gear 210 of the second planetary gear train 200 and the sun gears 330, 430 of the third and fourth planetary gear trains 300, 400. As a result, the sun gears 330, 430 of the third and fourth planetary gear trains 300, 400 will rotate at the same speed as the input shaft I. Engagement of the second clutch 116 connects the carriers 120, 320 of the first and third planetary gear trains 100, 300 with the ring gear 210 of the second planetary gear train and the sun gears 330, 430 of the third and fourth planetary gear trains 300, 400, each of which rotates at the speed of the input shaft I. In this way, both the carrier 320 and the sun gear 330 of the third planetary gear train 300 rotate at the speed of the input shaft I.

As a result, the ring gear 310 of the third planetary gear train 300 will rotate at a speed that is determined by the rotational speed of the carrier 320 and the sun gear 330, that is, the rotational speed of the input shaft I. The carrier 420 of the fourth planetary gear train 400 and the output shaft O will rotate at the same rotational speed as the ring gear 310 of the third planetary gear train 300. The numerical value of the sixth forward speed ratio (6F) is the same as the input shaft I and suns 130, 230, 330, 430, carriers 120, 220, 320, 420, and rings 110, 210 310, 410 of all planetary gear trains 100, 200, 300, 400 rotate at this speed.

The seventh forward speed ratio (7F) is established with the engagement of the second brake 112 and the second clutch 116. The engagement of the second brake 112 arrests rotational movement of the sun gear 230 of the second planetary gear train 200. The carrier 220 of the second planetary gear train 200 will rotate at the same speed as the input shaft I, and, therefore, the ring gear 210 of the second planetary gear train 200 will rotate at a speed determined by the speed of the input shaft I and the ring gear/sun gear tooth ratio of the second planetary gear train 200. The sun gears 330, 430 of the third and fourth planetary gear trains 300, 400 will rotate at the same speed as the ring gear 210 of the second planetary gear train 200.

Engagement of the second clutch 116 connects the carriers 120, 320 of the first and third planetary gear trains 100, 300 with the ring gear 210 of the second planetary gear train and the sun gears 330, 430 of the third and fourth planetary gear trains 300, 400. In this way, the carrier 320 and the sun gear 330 of the third planetary gear train 300 will rotate at the same speed. As a result, the ring gear 310 of the third planetary gear train 300 will rotate at a speed that is determined by the rotational speed of the carrier 320 and the sun gear 330 of the planetary gear train 300. The carrier 420 of the fourth planetary gear train 400 and the output shaft O will rotate at the same rotational speed as the ring gear 310 of the third planetary gear train 300. Thus, the numerical value of the seventh forward speed ratio (7F) is determined utilizing the ring gear/sun gear tooth ratio of the second planetary gear train 200.

The first reverse speed ratio (1R) is established with the engagement of the third brake 113 and the first clutch 115. The engagement of the third brake 113 arrests rotational movement of the carriers 120, 320 of the first and third planetary gear trains 100, 300. Engagement of the first clutch 115 connects the input shaft I, and the associated the ring gear 110 of the first planetary gear train 100 and carrier 220 of the second planetary gear train 200 with the ring gear 210 of the second planetary gear train and the sun gears 330, 430 of the third and fourth planetary gear trains 300, 400.

Inasmuch as carrier 320 of the third planetary gear train 300 is held stationary and the sun gear 330 of the third planetary gear train 300 rotates at the same speed as the input shaft I, the ring gear 310 of the third planetary gear train 300 will rotate at a speed that is determined by the rotational speed of the input shaft I and the ring gear/sun gear tooth ratio of the planetary gear train 300. The carrier 420 of the fourth planetary gear train 400 and the output shaft O will rotate at the same rotational speed as the ring gear 310 of the third planetary gear train 300. The numerical value of the first reverse speed ratio (1R) is determined utilizing the ring gear/sun gear tooth ratios of the third planetary gear train 300.

The second reverse speed ratio (2R) is established with the engagement of the second and third brakes 112, 113. The engagement of the second brake 112 arrests rotational movement of the sun gear 230 of the second planetary gear train 200. Inasmuch as the sun gear 230 of the second planetary gear train 200 is stationary and the carrier 220 of the second planetary gear train 200 rotates at the same speed as the input shaft I, the ring gear 210 of the second planetary gear train 200 will rotate at a speed determined by the rotational speed of the input shaft I and the ring gear/sun gear tooth ratio of the second planetary gear train 200. The sun gears 330, 430 of the third and fourth planetary gear trains 300, 400 will rotate at the same speed as the ring gear 210 of the second planetary gear train 200.

Engagement of the third brake 113 arrests rotational movement of the carriers 120, 320 of the first and third planetary gear trains 100, 300. Inasmuch as carrier 320 of the third planetary gear train 300 is held stationary, the ring gear 310 of the third planetary gear train 300 will rotate at a speed that is determined by the rotational speed of the sun gear 330 of the third planetary gear train 300, which rotates at the same speed as the ring gear 210 of the second planetary gear train 200, and the ring gear/sun gear tooth ratio of the planetary gear train 300. The carrier 420 of the fourth planetary gear train 400 and the output shaft O will rotate at the same rotational speed as the ring gear 310 of the third planetary gear train 300. Thus, the numerical value of the second reverse speed ratio (2R) is determined utilizing the ring gear/sun gear tooth ratios of the second and third planetary gear trains 200, 300.

It will be appreciated that the first and second clutches 115, 116 may be disposed in positions other than those illustrated in FIG. 1. Three other such clutch locations are provided by way of example in FIGS. 3-5. While examples of particular brake/clutch combinations and associated gear ratios for the embodiments illustrated in FIGS. 3-5, those of skill in the art will appreciate that the brakes/clutches may be combined in groups of two to achieve at least seven forward speeds and one or two reverse speeds. Moreover, those of skill will readily understand the associated operation of the gear trains, as well as the calculation of the respective gear ratios.

Figure 3:
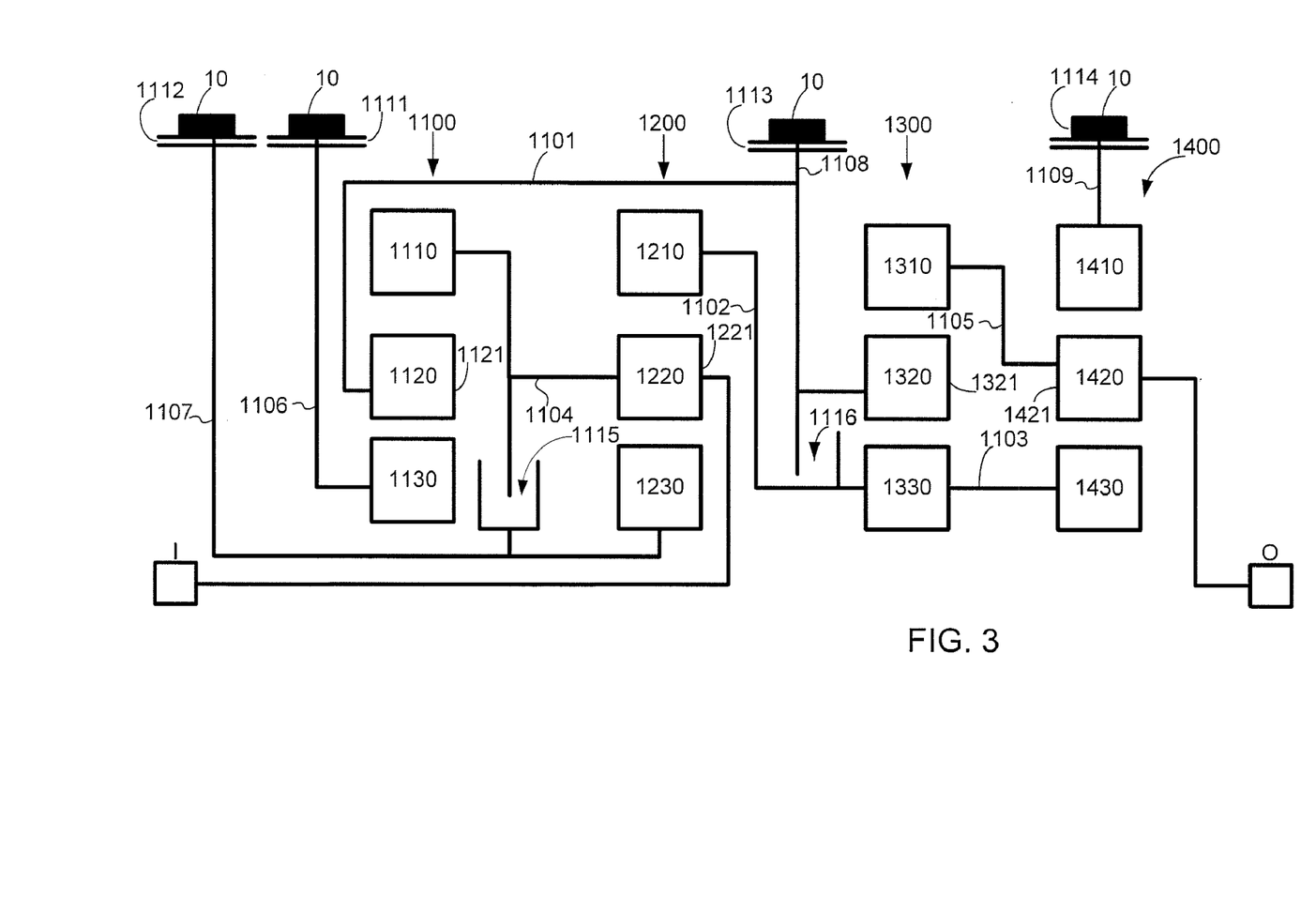
FIG. 3 is a schematic illustration of a second embodiment of an exemplary multispeed transmission according to the disclosure.

Turning to the embodiment of FIG. 3, similar items will be identified with similar numbers to those of FIG. 1, but all numbers will be preceded by the number 1, that is, reference numbers will be identified as 1XXX. The arrangement of FIG. 3 is identical to that of FIG. 1 with the exception that the first clutch assembly 1115 selectively interconnects the input shaft I, the ring gear 1110 of the first planetary gear train and the carrier 1220 of the second planetary gear train 1200 with the sun gear 1230 of the second planetary gear train 1200. The second selectively engagable clutch 1116, and the first, second, third, and fourth selectively engagable brakes 1111, 1112, 1113, 1114, and the input shaft I and output shaft O as well as the links 1101, 1102, 1103, 1104, 1105, 1106, are disposed in the same positions as illustrated in FIG. 1 relative to the ring gears 1110, 1210, 1310, 1410, the carriers 1120, 1220, 1320, 1420, the planet gears 1121, 1221, 1321, 1421, and the sun gears 1130 1230 1330 1430 of the first, second, third and fourth planetary gear trains 1100, 1200, 1300, 1400, respectively.

Figure 4:
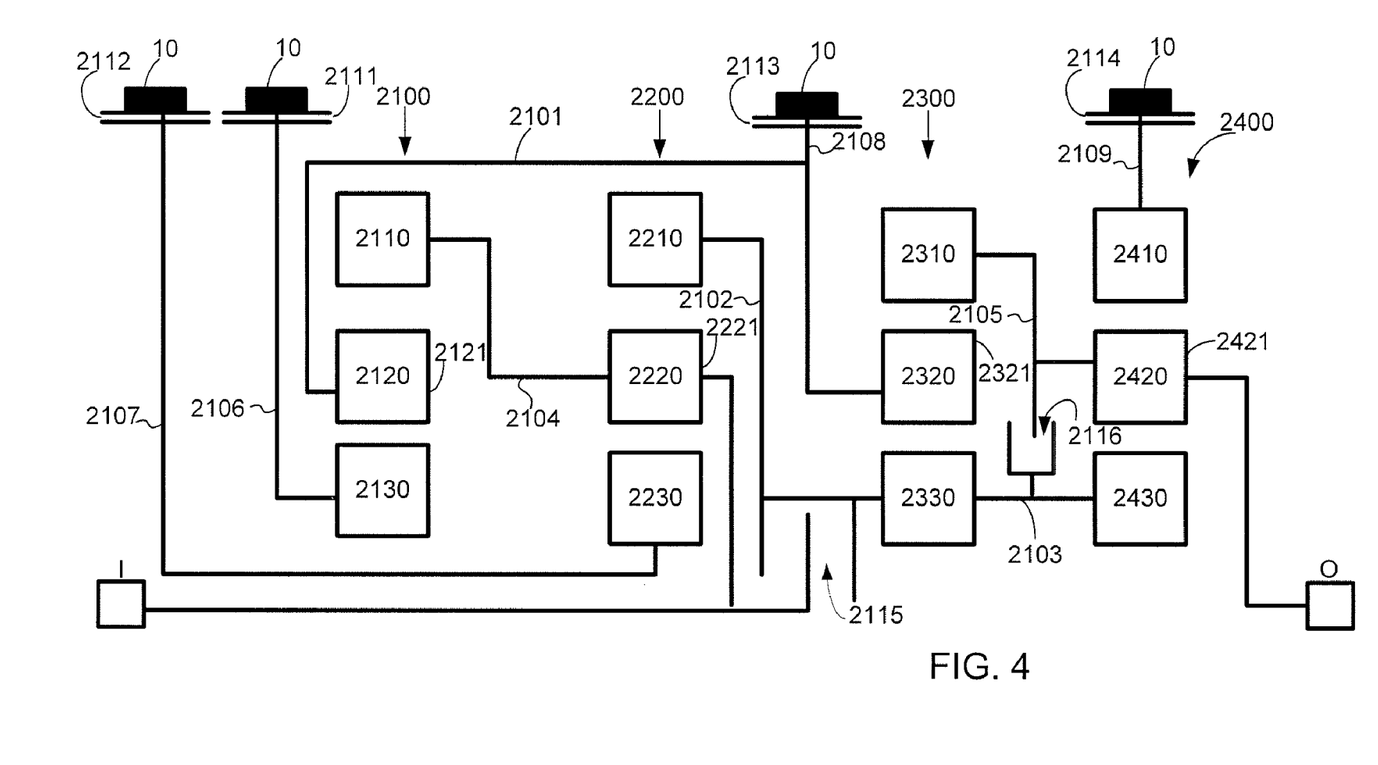
FIG. 4 is a schematic illustration of a third embodiment of an exemplary multispeed transmission according to the disclosure.

Turning to the embodiment of FIG. 4, similar items will be identified with similar numbers to those of FIG. 1, but all numbers will be preceded by the number 2, that is, reference numbers will be identified as 2XXX. The arrangement of FIG. 4 is identical to that of FIG. 1 with the exception that the second clutch assembly 2116 selectively interconnects the ring gear 2210 of the second planetary gear train 2200 and the sun gears 2330, 2430 of the third and fourth planetary gear trains 2300, 2400 with the ring gear 2310 of the third planetary gear train and the carrier 2420 of the fourth planetary gear train 2400, and, therefore, the output shaft O. The first selectively engagable clutch 2115, and the first, second, third, and fourth selectively engagable brakes 2111, 2112, 2113, 2114, and the input shaft I and the output shaft O, as well as the links 2101, 2102, 2103, 2104, 2105, 2106, are disposed in the same positions as illustrated in FIG. 1 relative to the ring gears 2110, 2210, 2310, 2410, the carriers 2120, 2220, 2320, 2420, the planet gears 2121, 2221, 2321, 2421, and the sun gears 2130 2230 2330 2430 of the first, second, and third planetary gear trains 2100, 2200, 2300, 2400, respectively.

Figure 5:
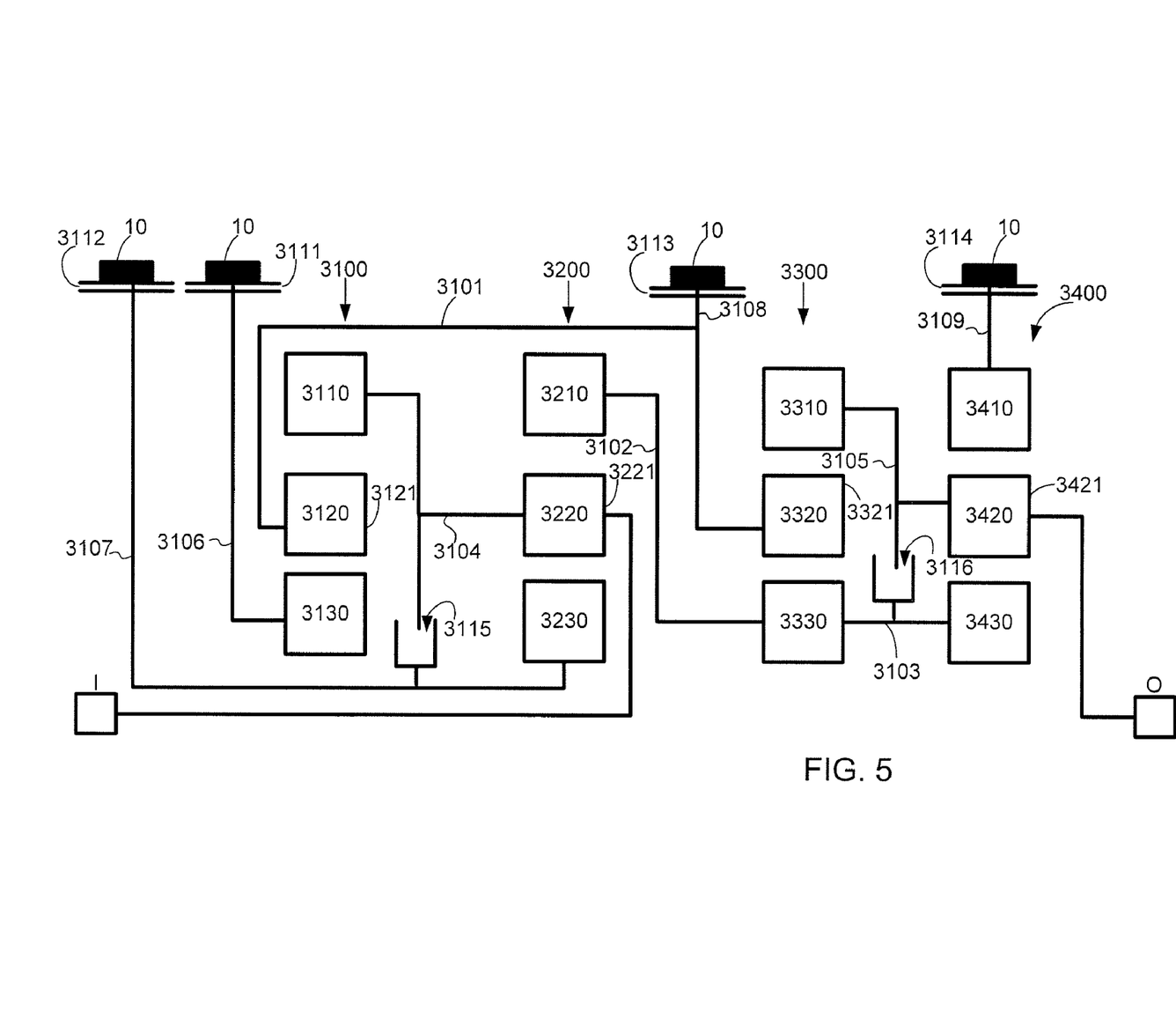
FIG. 5 is a schematic illustration of a fourth embodiment of an exemplary multispeed transmission according to the disclosure.

Turning now to the embodiment of FIG. 5, similar items will be identified with similar numbers to those of FIG. 1, but all numbers will be preceded by the number 3, that is, reference numbers will be identified as 3XXX. The arrangement of FIG. 5 is identical to that of FIG. 1 with the exception that the first clutch assembly 3115 is as shown in FIG. 3, and the second clutch assembly 3116 is as shown in FIG. 4. That is, the first clutch assembly 3115 selectively interconnects the input shaft I, the ring gear 3110 of the first planetary gear train 3100 and the carrier 3220 of the second planetary gear train 3200 with the sun gear 3230 of the second planetary gear train 3200. The second clutch assembly 3116 selectively interconnects the ring gear 3210 of the second planetary gear train 3200 and the sun gears 3330, 3430 of the third and fourth planetary gear trains 3300, 3400 with the ring gear 3310 of the third planetary gear train and the carrier 3420 of the fourth planetary gear train 3400, and, therefore, the output shaft O. The first, second, third, and fourth selectively engagable brakes 3111, 3112, 3113, 3114, the input shaft I and output shaft O, as well as the links 3101, 3102, 3103, 3104, 3105, 3106, are disposed in the same positions as illustrated in FIG. 1 relative to the ring gears 3110, 3210, 3310, 3410, the carriers 3120, 3220, 3320, 3420, the planet gears 3121, 3221, 3321, 3421, and the sun gears 3130 3230 3330 3430 of the first, second, and third planetary gear trains 3100, 3200, 3300, 3400, respectively.

It will thus be appreciated by those of skill in the art that the disclosed arrangement may be modified relative to the placement of the first and second clutch. The brakes and clutches may be selectively engaged in combinations of two in order to provide various gear reductions yielding at least seven forward gears, and at least one reverse gear.

INDUSTRIAL APPLICABILITY

The present disclosure is applicable to machines that incorporate power trains that use planetary transmission arrangements. The present disclosure may provide a transmission arrangement that is compact in size, yet provides at least seven forward speed ratios and at least one reverse speed ratio. As a result, some embodiments may be readily packaged into a machine transmission. Moreover, the compact nature of the arrangement may result in lower weight, and benefits that flow therefrom.

Some embodiments may provide high torque levels and/or uninterrupted torque flow.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A multi-speed transmission comprising:
   first, second, third and fourth planetary gear trains each having at least three members including a ring gear, at least one carrier, and a sun gear;
   a housing;
   an input shaft fixedly coupled to the carrier of the second planetary gear train and the ring gear of the first planetary gear train;
   an output shaft fixedly coupled to the carrier of the fourth planetary gear train and the ring gear of the third planetary gear train;
   a first link fixedly coupled to the carrier of the first planetary gear train and the carrier of the third planetary gear train;
   a second link and a third link fixedly coupled to the ring gear of the second planetary gear train and the sun gears of the third and fourth planetary gear trains; and
   six torque-transmitting mechanisms, each said torque-transmitting mechanism for selectively interconnecting at least one member of one of the planetary gear trains with at least one of the housing or other members of the planetary gear trains, the six torque-transmitting mechanisms being engaged in combinations of two to establish at least seven forward speed ratios and at least one reverse speed ratio between the input shaft and the output shaft.

2. The transmission of claim 1 wherein a first of said six torque-transmitting mechanisms is operable for selectively interconnecting a member of said first planetary gear train with said housing.

3. The transmission of claim 1, wherein a second of said six torque-transmitting mechanisms is operable for selectively interconnecting a member of said second planetary gear train with said housing.

4. The transmission of claim 1, wherein a third of said six torque-transmitting mechanisms is operable for selectively interconnecting at least one of a member of the first or third planetary gear trains with the housing.

5. The transmission of claim 1, wherein a fourth of said six torque-transmitting mechanisms is operable for selectively interconnecting a member of the fourth planetary gear train with the housing.

6. The transmission of claim 1, wherein a fifth of said six torque-transmitting mechanisms is operable for selectively interconnecting at least one of the input shaft or a member of said first or second planetary gear trains with at least one of a member of the second, the third, and the fourth planetary gear trains.

7. The transmission of claim 1, wherein a sixth of said six torque-transmitting mechanisms is operable for selectively interconnecting at least one of a member of the second, the third, or the fourth planetary gear trains with at least one of the output shaft and a member of the first, the third, and the fourth gear trains.

8. A multi-speed transmission comprising:
   a housing;
   first, second, third and fourth planetary gear trains each having at least three members including a ring gear, at least one carrier, and a sun gear;
   an input shaft fixedly coupled to the carrier of the second planetary gear train and the ring gear of the first planetary gear train;
   an output shaft fixedly coupled to the carrier of the fourth planetary gear train and the ring gear of the third planetary gear train;
   a first link fixedly coupled to the carrier of the first planetary gear train and the carrier of the third planetary gear train;
   a second link and a third link fixedly coupled to the ring gear of the second planetary gear train and the sun gears of the third and fourth planetary gear trains;
   a first torque-transmitting mechanism selectively interconnecting the sun gear of the first planetary gear train with the housing;
   a second torque-transmitting mechanism selectively interconnecting the sun gear of the second planetary gear train with the housing;
   a third torque-transmitting mechanism selectively interconnecting the carrier of the first planetary gear train and the carrier of the third planetary gear train with the housing;
   a fourth torque-transmitting mechanism selectively interconnecting the ring gear of the fourth planetary gear train with the housing;
   a fifth torque-transmitting mechanism selectively interconnecting at least one member of one of the planetary gear trains with at least one of the input shaft and a member of another of the planetary gear trains; and
   a sixth torque-transmitting mechanism selectively interconnecting at least one member of one of the planetary gear trains with at least one of the output shaft and a member of another of the planetary gear trains;
   the torque-transmitting mechanisms being engaged in combinations of two to establish at least seven forward speed ratios and at least one reverse speed ratio between said input shaft and said output shaft.

9. The transmission of claim 8 wherein the fifth torque-transmitting mechanism selectively interconnects at least one of the input shaft, the carrier of the second planetary gear train, and the ring gear of the first planetary gear train with at least one other gear.

10. The transmission of claim 9 wherein the fifth torque-transmitting mechanism selectively interconnecting at least one of the input shaft, the carrier of the second planetary gear train and the ring gear of the first planetary gear train with at least one of the ring gear of the second planetary gear train, the sun gear of the third planetary gear train, the sun gear of the fourth planetary gear train, and the sun gear of the second planetary gear train.

11. The transmission of claim 10 wherein the fifth torque-transmitting mechanism selectively interconnecting at least one of the input shaft, the carrier of the second planetary gear train and the ring gear of the first planetary gear train with at least one of the ring gear of the second planetary gear train, the sun gear of the third planetary gear train, or the sun gear of the fourth planetary gear train.

12. The transmission of claim 10 wherein the fifth torque-transmitting mechanism selectively interconnecting at least one of the input shaft, the carrier of the second planetary gear train and the ring gear of the first planetary gear train with the sun gear of the second planetary gear train.

13. The transmission of claim 9 wherein the sixth torque-transmitting mechanism selectively interconnects at least one of the ring gear of the second planetary gear train, the sun gear of the third planetary gear train, and the sun gear of the fourth planetary gear train with at least one of the output shaft and another member of one of the gear trains.

14. The transmission of claim 8 wherein the sixth torque-transmitting mechanism selectively interconnects at least one of the ring gear of the second planetary gear train, the sun gear of the third planetary gear train, and the sun gear of the fourth planetary gear train with at least one of the output shaft and another member of one of the gear trains.

15. The transmission of claim 14 wherein the sixth torque-transmitting mechanism selectively interconnects at least one of the ring gear of the second planetary gear train, the sun gear of the third planetary gear train, and the sun gear of the fourth planetary gear train with at least one of the output shaft, the carrier of the first planetary gear train, the carrier of the third planetary gear train, the ring gear of the third planetary gear train, and the carrier of the fourth planetary gear train.

16. The transmission of claim 15 wherein the sixth torque-transmitting mechanism selectively interconnects at least one of the ring gear of the second planetary gear train, the sun gear of the third planetary gear train, and the sun gear of the fourth planetary gear train with at least one of the carrier of the first planetary gear train and the carrier of the third planetary gear train.

17. The transmission of claim 15 wherein the sixth torque-transmitting mechanism selectively interconnects at least one of the ring gear of the second planetary gear train, the sun gear of the third planetary gear train, and the sun gear of the fourth planetary gear train with at least one of the output shaft, the ring gear of the third planetary gear train, and the carrier of the fourth planetary gear train.

18. The transmission of claim 16 wherein the first, second, third, and fourth torque-transmitting mechanisms comprise brakes, and said fifth and sixth torque-transmitting mechanisms comprise clutches, and wherein the fifth torque-transmitting mechanism selectively interconnects at least one of the input shaft, the carrier of the second planetary gear train and the ring gear of the first planetary gear train with at least one of the ring gear of the second planetary gear train, the sun gear of the third planetary gear train, and the sun gear of the fourth planetary gear train.

19. A multi-speed transmission comprising
a housing,
first, second, third, and fourth planetary gear trains, each train having at least three members including a sun gear, a carrier, and a ring gear,
an input shaft and an output shaft, and
selectively engageable control elements, the selective engagement of the control elements creating different gear ratios between the input shaft and the output shaft so that at least seven forward gears and one reverse gear can be implemented, the control elements including
first, second, third and fourth brakes, and
first and second torque transmitting mechanisms,
the carrier of the second gear train, the input shaft, and the ring gear of the first gear train being fixedly coupled together,
the carrier of the first gear train and the carrier of the third gear train being fixedly together,
the ring gear of the second gear train, the sun gear of the third gear train and the sun gear of the fourth gear train being fixedly coupled together,
the carrier of the fourth gear train, the output shaft, and the ring gear of the third gear train being fixedly coupled together,
the sun gear of the first gear train being detachably connected to the housing by the first brake,
the sun gear of the second gear train being detachably connected to the housing by the second brake,
the carriers of the first and third gear trains being detachably connected to the housing by the third brake,
the ring gear of the fourth gear train being detachably connected to the housing by the fourth brake,
the first torque transmitting mechanism detachably connecting the input shaft, ring gear of the first train, and carrier of the second train to one of
the ring gear of the second gear train, and the sun gears of the third and fourth gear trains, or
the sun gear of the second gear train; and
the second torque transmitting mechanism detachably connecting the ring gear of the second gear train, and the sun gears of the third and fourth gear trains to one of
the carrier of the first gear train and the carrier of the third gear train, or
the ring gear of the third gear train, the carrier of the fourth gear train, and the output shaft.

20. The multi-speed transmission of claim 19 wherein
the first torque transmitting mechanism detachably connecting the input shaft, ring gear of the first train, and carrier of the second train to the ring gear of the second gear train, and the sun gears of the third and fourth gear trains; and
the second torque transmitting mechanism detachably connects the ring gear of the second gear train, and the sun gears of the third and fourth gear trains to the carrier of the first gear train and the carrier of the third gear train.

* * * * *